United States Patent Office 3,556,746
Patented Jan. 19, 1971

3,556,746
METALLIZING THERMOPLASTIC SHAPED ARTICLES
Gunther Bernhardt, Hangelar, Robert Buning and Egon Bierwirth, Oberlar, and Werner Trautvetter, Spich, Germany, assignors to Dynamit Nobel Aktiengesellschaft, Troisdorf, Germany, a corporation of Germany
No Drawing. Filed Oct. 3, 1968, Ser. No. 765,748
Claims priority, application Germany, Oct. 5, 1967,
D 54,263
Int. Cl. B32b 15/08
U.S. Cl. 29—195                    5 Claims

ABSTRACT OF THE DISCLOSURE

A shaped article of a vinylchloride grafted copolymer of ethylene and vinylchloride having on the surface thereof a metal film and process for producing such metallized shaped article comprising (1) preparing an ethylene-vinylchloride copolymer, (2) grafting vinylchloride onto said copolymer, (3) forming said graft copolymer into a shaped article and (4) applying a metal film to the surface of said article.

---

This invention relates to metallizing thermoplastic shaped articles. More particularly this invention relates to metallizing shaped articles of vinylchloride grafted ethylene-vinylchloride copolymers.

In U.S. patent application Ser. No. 682,558 a process for metallizing thermoplastic shaped articles by the application of a metal film, i.e., by the chemical reduction of a metal salt solution, such as a copper and/or nickel and/or silver salt solution, on the thermoplastic shaped article surface followed by electroplating a suitable desired metal coating thereon. The process is especially characterized in that articles prepared from vinylchloride-ethylene copolymers are metallized. According to a preferred embodiment, copolymers containing from 1 to 20% by weight of copolymerized ethylene are used in making the shaped articles to be employed in the metallizing.

In accordance with the invention it has now been found that articles prepared from copolymers of ethylene and vinylchloride onto which vinylchloride has been grafted can be advantageously used as the base for applying a metal coating thereon by the application of a metal film on the copolymer shaped article surface and then electroplating a suitable desired metal coating thereon.

Copolymers formed from vinylchloride and ethylene containing 20 to 50% by weight ethylene are preferred for utilization in the grafting. The K values of the suitable copolymers preferably ranges from 25 to 70. For special purposes, however, copolymers having a lower or higher ethylene content or lower or higher K values can also be used.

The grafting of the above set out copolymers can be carried out in an autoclave as conventionally used in the polymerization of vinylchloride. The grafting is advantageously conducted so that the resultant grafted polymers will have an ethylene content of 1 to 20% by weight. The vinylchloride can also be polymerized onto the aforesaid copolymers together with ethylenically unsaturated monomers capable of polymerization with vinylchloride. The comonomers used for the grafting can be contained in the resultant graft polymer in quantities of 0.1 to 10% by weight.

Examples of ethylenically unsaturated monomers which can be copolymerized with vinylchloride are vinyl esters such as vinyl acetate, vinyl propionate, etc.; esters of unsaturated acids such as acrylic esters and methacrylic esters, for instance, methyl acrylate, ethyl acrylate, 2-ethylhexyl acrylate, n-octyl acrylate, methyl methacrylate, ethyl methacrylate, and the like; and vinylidene chloride and related compounds.

By varying the ethylene content in the starting copolymer and varying the vinylchloride or comonomer content of the graft, the articles to be metallized can be adapted for many different and varied applications.

The fact that articles prepared from the graft polymers according to the invention are suitable is to be considered all the more surprising as experiments have shown that the compounding of a copolymer with homopolymers or copolymers of vinylchloride results in the production of articles which metallize only poorly if at all. The metallization of articles prepared on a basis of such compounds results in a mere encapsulation of the article, a genuine bond between the metal and the article is not realized. The strength of adherence of the electrochemically applied metal films determined according to DIN 40802 is less than 0.2 kg. per 25 mm. of width, whereas strengths are required to be greater than 1.0 kg. per 25 mm. of width for satisfactory use. Nevertheless, when the metallization is carried out on articles prepared from copolymers formed from vinylchloride and ethylene followed by grafting with vinylchloride, together, if desired, with ethylenically unsaturated monomers capable of polymerization with vinylchloride, strengths of adherence are surprisingly achieved which far exceed these requirements. The manufacture of the graft polymers of the invention into articles can be carried out by the known methods. The stabilizers conventionally used with polyvinylchloride can be added to the compounds prior to their use in the manufacturing procedure.

The invention and some of its advantages will be illustrated by the following examples, the same, however, are not to be construed as in anywise limiting the same.

EXAMPLES 1a–c AND 2a–c

Two types of materials were compared with one another. Type 1 designates compounds as known while type 2 illustrates the use of the graft polymers according to the invention.

EXAMPLES 1a–c

The compounding of the copolymer obtained from polymerizing vinylchloride with ethylene (32 wt.-percent ethylene) was carried out using the conventional precipitation of the mixed emulsions. The quantity of polyvinylchloride emulsion that was added was such that the precipitated material had a varying ethylene content.

| Example— | Percent ethylene by weight |
|---|---|
| 1a | 2 |
| 1b | 4 |
| 1c | 6 |

EXAMPLES 2a–c

A copolymer formed from vinylchloride with ethylene was also used for the grafting. The copolymer had an ethylene content of 32% by weight. The graft polymerization was conducted in the conventional manner in emulsion in the presence of water-soluble peroxides. A suspension polymerization process can, of course, also be used in place of the emulsion polymerization. In this connection the polymerization temperatures can vary from −60 to +80° C. The polymerization was carried out so that the resultant graft polymers had varying ethylene contents.

| Example— | Percent ethylene by weight |
|---|---|
| 2a | 2 |
| 2b | 4 |
| 2c | 6 |

There was added to the above described materials 2% by weight of a tin stabilizer, available commercially under the tradename ADVASTAB M 17 and which corresponds to the formula:

$(C_4H_9)_2Sn(S-CH_2-COO-C_8H_{17})_2$

Thereafter plates 4 mm. thick were pressed from the worked mixtures and the plates then used in the metallization runs. The metallization was conducted according to the procedure disclosed in application Ser. No. 682,558. Specifically, the vinylchloride grafted ethylenevinylchloride copolymer shaped article is suitably degreased, etched, the etchant neutralized, surface densitized and activated. The thusly treated shaped article is then immersed in an aqueous solution containing known materials including the metal from which it is desired to form the film.

The strengths of adherence of the metal films thereby obtained was determined according to the procedure of DIN 40802. The values which were found are set out in the following table:

TABLE

| Material | | Wt.-percent of ethylene | Strength of adherence (per DIN 40802) in kg./25 mm. width. |
|---|---|---|---|
| Example: | | | |
| 1a | Compound | 2 | Less than 0.2. |
| 1b | do | 4 | Less than 0.2. |
| 1c | do | 6 | Less than 0.2. |
| 2a | Graft polymer | 2 | 2.4. |
| 2b | do | 4 | 4.1. |
| 2c | do | 6 | 7.8. |

The strengths of adherence of the metal films to the surfaces of the shaped plastic articles as illustrated in the examples was observed to exist independent of whether the base layer comprises nickel or copper and the electrolytically produced plating layer of approximately 40 micron thickness comprised copper, nickel or chromium.

EXAMPLE 3

Surface pretreatment of shaped articles produced according Examples 2a–c and 1a–c (1) Degreasing with 40% caustic soda solution.
(2) Etching with chromosulfuric acid (40 g. $K_2Cr_2O_7$, 20 g. $H_2O$, 500 ml. conc. sulfuric acid), at elevated temperature if desired.
(3) Neutralizing with 20% aqueous $NaHSO_3$ solution.
(4) Sensitizing with stannous chloride solution (35 g. $SnCl_2$, 50 ml. conc. HCl, 1000 ml. $H_2O$).
(5) Activation with silver nitrate solution (dissolve 2 g. $AgNO_3$ in water, add 10 ml. conc. $HN_4OH$ and add water to make 1 liter).

EXAMPLE 4

Production of metal film on pretreated shaped article (A) The following solutions are individually prepared and mixed together in a 1:1 volume ratio:

Solution a:
  31.8 g. copper sulfate
  8.2 g. nickel chloride
  76.6 g. 37% aqueous formaldehyde solution
  532 ml. water.

Solution b:
  23.9 g. NaOH
  95.5 g. potassium sodium tartrate
  8.2 g. $Na_2CO_3$
  532 ml. water.

The shaped article is immersed in the mixed solution for 30 minutes and a metal film 0.25µ thick is deposited thereon.

(B) The following solution is prepared:

30 g. nickel chloride
  10 g. sodium hypophosphite
  100 g. sodium citrate
  50 g. ammonium chloride
  Water to make 1000 ml.
  $NH_4OH$ to adjust pH to 8–10 the shaped article is immersed in this solution at 90° C. for 60 minutes and a nickel film 1–3µ thick is deposited thereon.

(C) In a manner similar to that set forth in B above, a silver film is applied using silver salt solution containing a reducing agent.

EXAMPLE 5

Electroplating

Copper was plated onto the shaped articles having metal film adhered thereto as set forth above. The plating bath was 250 g. $CuSO_4$, 100 g. $H_2SO_4$ and 1000 ml. water. The voltage was 0.5 volt.

In a similar and analogous manner, silver, gold, nickel and chromium is electroplated onto the metal film coated shaped articles.

Shaped articles according to this invention include films, filaments, sheeting, compression molded shapes such as pipe and other fittings, blow molded shapes such as bottles, injection molded shapes such as automobile parts, and extruded shapes such as channels, T bars, etc.

EXAMPLE 6

Production of vinylchloride grafted copolymers of ethylene and vinylchloride

The vinylchloride grafted copolymers of ethylene and vinylchloride used for the production of shaped articles and their metallisation in the foregoing examples are produced by methods known for vinylchloride grafting of copolymers' of ethylene and vinyl-group containing monomers. Such grafting polymerisations are described by Houben-Weyl, Methoden der organischen Chemie, vol. 14/1 Makromolekulare Stoffe pages 110, 824, 832, 1128 (1961), in the U.S. patent specification 3,326,829, the French patent specifications 1,459,087 and 1,435,848 and the Belgian patent specification 636,977.

When emulsion-polymerisation methods are used, water and/or organic solvents may be used as medium and as emulsifying agents for example fatty acids or their esters aryl- or alkylsulfonates etc. For methods of suspension polymerisation as dispersing agents as well organic as inorganic dispersants are useful as gelatine pectine, polyvinylalcohols, water soluble starch, polyacrylic or polymethacrylic acids and their salts, finely divided talcum, kaoline, calciumphosphates or-carbonates, or corresponding magnesium salts. As catalysts may be used as well azo compounds of the type of azo-iso-butyronitrile as peroxides of the water-soluble or monomer-soluble types as persulfates, benzoyl-, lauroyl-, or caproylpersulfate, hydrogen-peroxide or redoxsystems of an organic reducing compound, a salt of transition metals and one of the named peroxides.

The copolymer of ethylene and vinylchloride may be used as finely divided solid or as an emulsion.

The ratio of monomer vinylchloride and vinylchloride/ ethylene-copolymer used in grafting process generally will be the same as wanted and effectuated in the produced grafted polymer.

The used copolymers of ethylene and vinylchloride may be produced according to U.S. Pats. 2,396,677 or 2,388,225 or the French Pat. 1,260,481 or as more closely described in the corresponding U.S. patent application Ser. No. 682,558.

The process of grafting vinylchloride alone or together with the said further monomers on the copolymer of ethylene and vinylchloride may be effectuated as given below:

A mixture of 5,800 ml. of desalted water, 270 ml. of a 20 weight percent kaliumpersulfate solution, 2,970 g. vinylchloride and 534 g. of an emulsion of ethylene/vinylchloride-copolymer (solid content 330 g., 31.1 weight percent chlorine in the solid) is placed in a steel-autoclave. The contents of the autoclave is stirred at a temperature of 50° C. After a polymerisation time of 21 hours the emulsion is produced grafted polymer is removed and a 2 weight percent sodium chlorine solution is added to coagulate and precipitate the grafted polymer. After drying the solid grafted polymer at 50° C. the obtained product having a chloride content of 53.0 weight percent, a vicat of 77° C. and a relative viscosity of 2.06 (measured in 1 weight percent solution of cyclohexanone at 20° C.).

A solid grafted polymer of same properties is formed when instead of precipitating the emulsion is spray dried by injecting in a vacuum vessel.

In quite analogous manner the process of graft polymerisation may be realized at lower or higher temperatures, whereby other relative viscosities of the products are obtained, with another ratio of dispersing medium respective to vinylchloride monomer and the copolymers, by using another ratio of monomer vinylchloride and ethylene/vinylchloride-copolymers, by carrying out the process in presence of an ethylene/vinylchloride-copolymer of other ethylene contents, which is equivalent to other chloride content of the copolymer or by using a monomer mixture of vinylchloride and one or more of said copolymerizable other monomers in amounts up to 10 weight percent related on produced grafted polymers, as long as this variable conditions are in accordance with producing grafted copolymers of a 1 to 20 weight percent ethylene content.

We claim:

1. A shaped article of a vinylchloride grafted copolymer of ethylene and vinylchloride having on the surface thereof a metal film.

2. A shaped article as claimed in claim 1, wherein said grafted copolymer contains about 1 to 20 wt. percent ethylene.

3. A shaped article as claimed in claim 1, wherein said metal is at least one member selected from the group consisting of nickel, copper and silver.

4. A shaped article as claimed in claim 1, having an electroplated metal coating on top of said metal film.

5. A shaped article as claimed in claim 4, wherein said metal coating is at least one member selected from the group consisting of nickel, copper, silver, gold and chromium.

References Cited

UNITED STATES PATENTS

| | | | |
|---|---|---|---|
| 2,993,806 | 7/1961 | Fisher et al. | 117—71 |
| 3,235,473 | 2/1966 | LeDuc | 204—30 |

L. DEWAYNE RUTLEDGE, Primary Examiner

ERNEST L. WEISE, Assistant Examiner

U.S. Cl. X.R.

117—71, 130; 161—216; 204—30